United States Patent [19]

Csakvary et al.

[11] Patent Number: 4,557,663
[45] Date of Patent: Dec. 10, 1985

[54] MODULAR, LOW COST, POGRAMMABLE ASSEMBLY SYSTEM

[75] Inventors: Tibor Csakvary, Pittsburgh; Lanson Y. Shum, Wexford Borough; Bernard Miller, Pittsburgh, all of Pa.

[73] Assignee: Westinghouse Electric Corp., Pittsburgh, Pa.

[21] Appl. No.: 569,076

[22] Filed: Jan. 9, 1984

[51] Int. Cl.[4] .............................................. B23Q 3/18
[52] U.S. Cl. ........................................ 414/751; 269/58
[58] Field of Search ....................... 414/749, 750, 751; 269/58

[56] References Cited

U.S. PATENT DOCUMENTS

| | | | |
|---|---|---|---|
| 2,851,910 | 9/1958 | Zwick et al. | 77/4 |
| 3,202,895 | 8/1965 | Arp et al. | 318/162 |
| 3,270,591 | 9/1966 | Winter, IV | 77/64 |
| 3,359,583 | 12/1967 | Strube | 10/139 |
| 3,376,764 | 4/1968 | Schardt | 77/64 |
| 3,638,933 | 2/1972 | Burnette et al. | 269/60 |
| 3,702,604 | 11/1972 | Jones | 125/14 |
| 3,790,155 | 2/1974 | Longamore | 269/60 |
| 3,889,105 | 6/1975 | Schneckloth | 318/572 X |
| 3,915,442 | 10/1975 | Marantette | 269/71 |
| 3,917,249 | 11/1975 | Constantine | 269/58 |
| 3,936,743 | 2/1976 | Roch | 269/55 X |
| 3,970,830 | 7/1976 | White et al. | 318/567 X |
| 4,138,082 | 2/1979 | Fatemi | 248/419 |
| 4,163,183 | 7/1979 | Engelberger et al. | 318/568 |
| 4,221,533 | 9/1980 | Heim et al. | 414/750 X |

Primary Examiner—William E. Wayner
Attorney, Agent, or Firm—E. C. Arenz

[57] ABSTRACT

A programmable assembly system for performing any of a variety of operations for different batch assemblies wherein at least some of the batches have different end points is obtained by using a limited capability, high reliable, high speed pick and place robot 30 mounted on a machine base 10 which has the capability of shifting its table 14 in any of three perpendicular directions so that any style changeover between batches the machine base is operated in a program manner to set up for a different batch operation.

2 Claims, 3 Drawing Figures

MODULAR, LOW COST, POGRAMMABLE ASSEMBLY SYSTEM

BACKGROUND OF THE INVENTION

This invention pertains to the art of assembly systems using robots.

The assembly of industrial products, manufactured by low volume batch production methods, is one of the most costly processes in industry. Some degree of automation would be a way to reduce the cost of assembly. However, because of the low volume involved in the batch production method (usually 10 to 2,000 products in a batch), conventional programmable automatic assembly systems for these products are needed but often cannot be economically justified. A programmable automatic assembly system would imply the inclusion therein of what is sometimes called servo-controlled robots, which in a published article entitled "Basics of Robotics", by Williams R. Tanner are characterized in part as relatively complex, more expensive, more involved to maintain, and less reliable than non-servo robots.

In that same article, Mr. Tanner discusses non-servo robots as follows: "Non-servo robots are often referred to as 'end point,' 'pick and place,' 'bang-bang' or 'limited sequence' robots. However, these terms imply limited capability and restricted applicability, which is not necessarily the case. The term "non-servo" is more descriptive and less restrictive than the others used." He also states that common characteristics of non-servo robots include: "relatively high speed is possible, due to the generally smaller size of the manipulator." "Repeatability to within 0.25 mm. (0.010 in.) is attainable on the smaller units." "These robots are relatively low in cost; simple to operate, program and maintain; and are highly reliable." "These robots have limited flexibility in terms of program capacity and positioning capability."

The term "non-servo robot" is used in this application in the same sense as in the noted article and to distinguish it from the servo-controlled robot.

The aim of the invention is to provide a versatile, programmable, high speed assembly system which uses the highly reliable, highly accurate, and low cost non-servo robot as a part thereof.

SUMMARY OF THE INVENTION

In accordance with the invention, a non-servo robot is supported on the table of a relatively heavy machine base, the machine base including means for shifting the table in at least two different directions, and sometimes a third direction in accordance with need, these directions being along X, Y, and Z axes, the shifting means being operable in the absence of operation of the robot to reposition the table and accordingly reposition the end points of the robot in accordance with the product style of whatever batch operation is to be performed.

DESCRIPTION OF THE PREFERRED EMBODIMENTS

Figure 1:
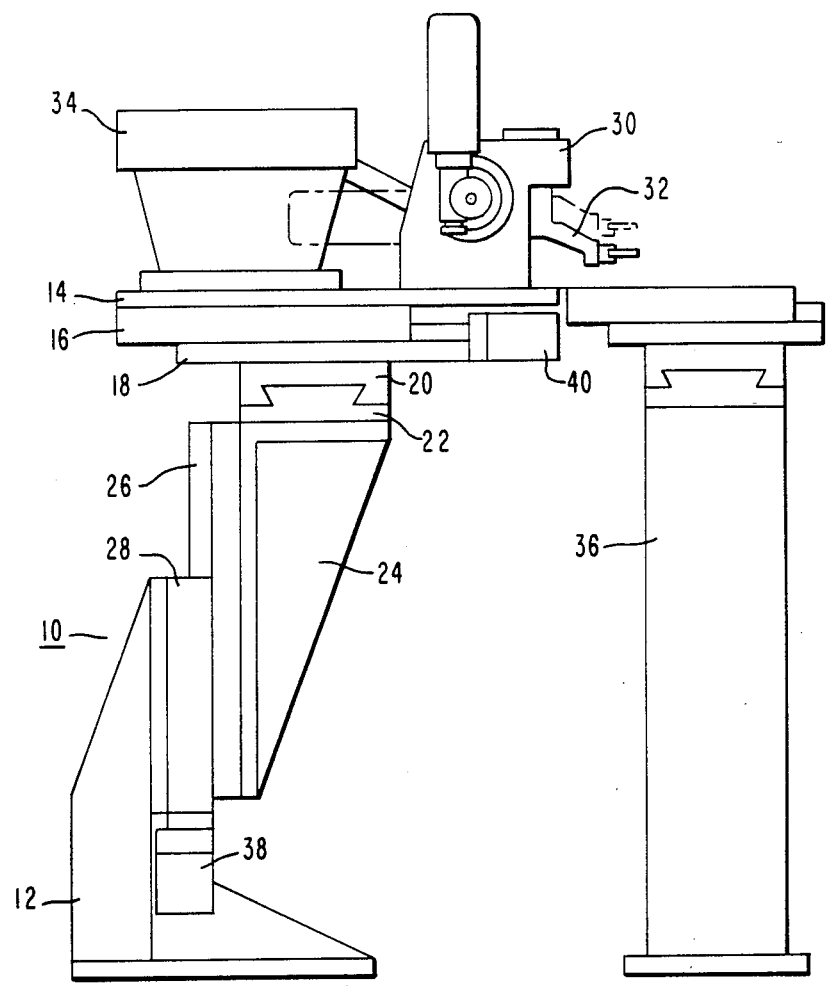
FIG. 1 is a somewhat diagrammatic side view of a single work station according to the invention.

In FIG. 1, a machine base generally designated 10 has a stationary base portion 12, a table element 14, an intermediate slide and guide portions which permit the table 14 to be shifted relative to the base in directions having X, Y and Z coordinates. The slide 16 supporting the table 14 is movable in one horizontal direction relative to its guide 18. The guide 18 is supported by the slide 20 which is movable in another horizontal direction perpendicular to the one horizontal direction by movement relative to the guide 22. The guide 22 in turn is supported on the intermediate frame 24 which is movable in a vertical direction by movement of its slide 26 relative to the guide 28 which is secured to the base 12. The machine base thus far described is conventional and is readily available commercially.

The table 14 supports a non-servo robot which will hereafter be referred to as a high speed pick and place robot 30. Such a high speed pick and place robot has a movable arm 32 which usually has hard stops at each axis. The arm is typically constructed mechanically so that it has only one picking and one placing point. These points are usually manually adjusted for given end points. If the robot is to be used in an operation in which different end points are required, and these different end points are not available through other means than the pick and place robot itself, then the robot must have the points manually adjusted and reset.

In FIG. 1, there is also shown a part feeder 34 mounted on the table 14, the feeder delivering the particular part to the pick end point of the robot. FIG. 1 also shows a separate table 36 which, as presently contemplated, is a high speed, servo-controlled XY axis table and which functions to support whatever is to receive the part being placed by the robot 30.

In the preferred form, the various slides of the machine base are driven by lead-screws (not shown) as is conventional with machine bases, with the lead screws being coupled through gearing (not shown) driven by low cost AC to DC geared motors. Two of these motors, 38 and 40, are shown, the first being adapted to move the table vertically, and the second being adapted to move the table in one of the horizontal directions. The preferred gear ratio is in the order of 100 to 500:1 so that the motors can be quite small and the motion of the arm 32 of the robot will not overdrive the lead screws. The machine base is selected so that it is sufficiently heavy that it will absorb all of the reactions of the arm motions without being overdriven and lose its program locations.

An important consideration in batch production is the style changeover time from one batch to the next. It is our view that a changeover cycle of up to five minutes is tolerable. While a high gear ratio motor for driving the lead screw will add time relative to a low gear ratio motor, it is advantageous that the motor may be of low horsepower, such as 1/50th to 1/30th, and also permits the use of a simple optical or magnetic proximity counter to count the revolutions of the motor shaft.

If a five minute changeover time is considered tolerable, the arrangement according to the invention permits the electronic device to be shared by several axes through electrical switching. In one preferred embodiment which this invention permits is to have any shift of the table in any direction occur by first driving it back to a mechanical stop so that when this occurs, the motor current will go up and a current sensing circuit will then stop the motion and reset the counter. A computer then loads the counter a program distance of forward travel and the motor then drives forward to that location. This will eliminate any backlash in the system. Such a type of operation mode as is permitted by the invention provides similar accuracy to that found in mechanical components moving up to a hard stop. Position feedback is achieved by the proximity sensor which counts the motor rotations. Since the motor direction is already determined by the driving voltage, the proximity sensor only needs to determine the movement and not the direction. With the application of such a control design to the machine base, that control design is simplified and its cost is lowered along with an improved reliability of the sensor.

The modular nature of the low cost programmable assembly system as described enables the user to reduce the required equipment investment to the minimum compatible with his assembly needs. An additional advantage of using the simple non-servo robots, such as the pick and place device, is that the user can obtain the high accuracies inherent in the simple devices which, do have better placement accuracies than can be obtained and complex, multi-axis robot devices which are classified as noted before as servo-controlled robots.

Where the same part is to be picked up at one point, but the delivery point may vary in accordance with adjustment of the machine base, then the part feeder 34 and the robot 30 are located in fixed relation on the table 14. In the converse situation, where the pick up point may vary in accordance with picking up different parts for different product styles, but the placement point is at the same location, then the part feeder 34 can be mounted separately on a machine base 10 as described, and the robot can be mounted in a fixed position on its own base.

Figure 2:
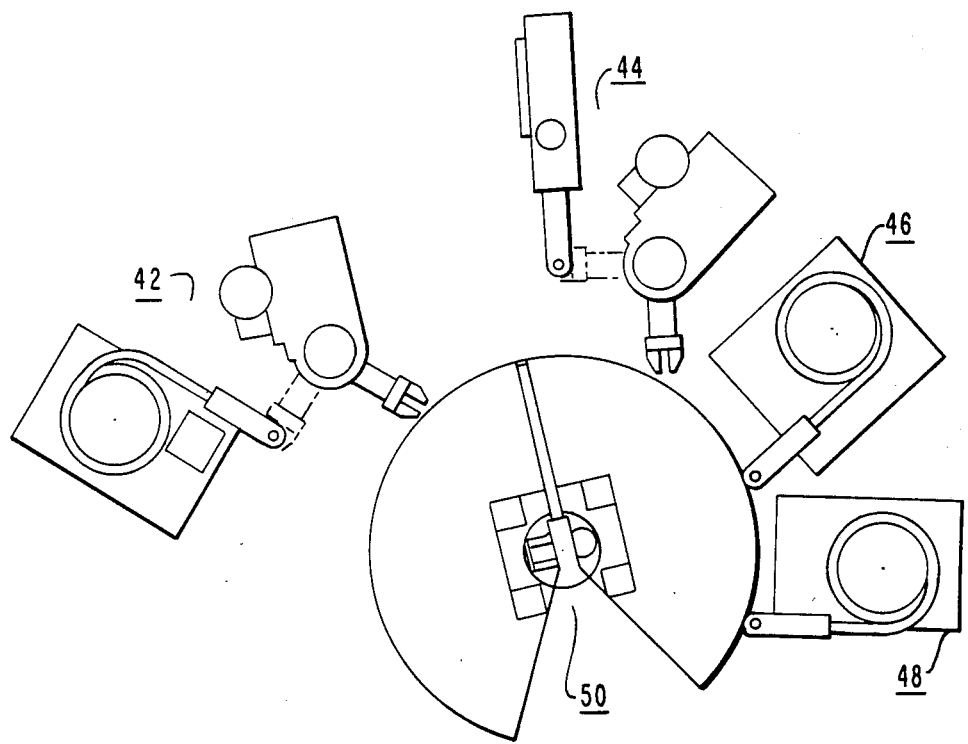
FIG. 2 is a somewhat diagrammatic top view showing one arrangement in which a plurality of work stations embodying the invention are grouped together in one particular configuration.

The programmable work stations can be grouped together in different configurations to form flexible assembly systems. One such system is shown in FIG. 2 in which a number of programmable work stations generally designated 42, 44, 46 and 48 are arrayed in the form of an arc, while a multi-position pick and place robot 50 is located in the center of the arc and does the transfer of the workpieces to each station. In the illustration 42 comprises both one type of feeder and a robot on a single programmable machine base, while 44 indicates a different type of feeder and a robot on another programmable machine base. 46 and 44 are both feeders on a programmable machine base. The advantages of this embodiment is that the central arm has the freedom of altering the assembly sequence depending upon the style of the workpiece, and assembly task requirements. The work station arrangement does not have to be sequential. Any change to the assembly sequence and part selection is done entirely through software. For low volume production and especially for highly customized product, this system has great flexibility.

Figure 3:
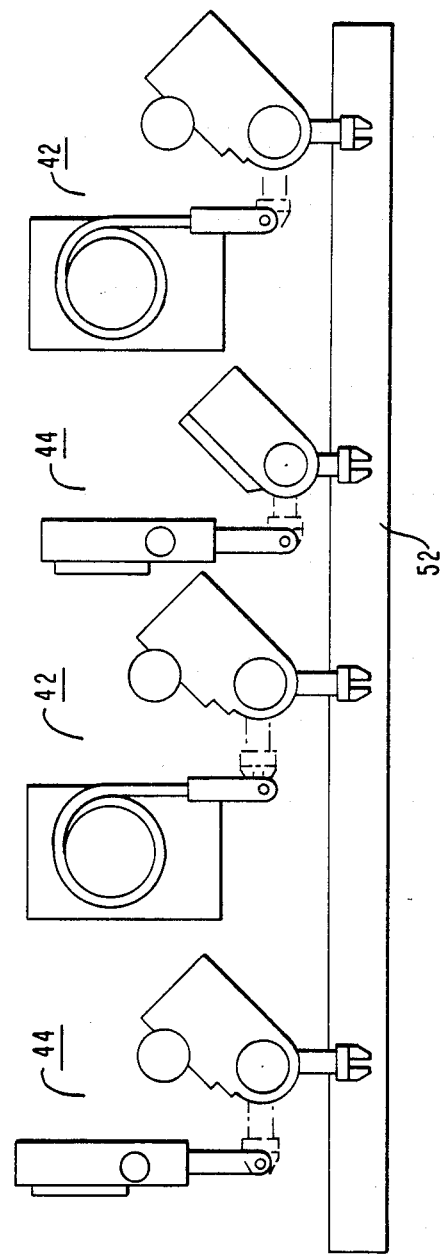
FIG. 3 is another somewhat diagrammatic top view showing another arrangement of work stations according to the invention grouped together.

In the embodiment shown in FIG. 3, the feeder and robot combinations 42 and 44 are arranged in a conventional transfer line configuration in a straight line adjacent the table 52. In using this arrangement most advantageously, all work stations operate simultaneously so that the cycle time is the shortest. The work stations are arranged according to the assembly sequence. The style change, component selection, delivery point alteration and operation selection is again accomplished by software.

In summary, it should be appreciated that the inventive arrangement utilizes the common, limited capability, high speed pick and place arm with the programmable machine base to obtain a highly flexible, programmable, assembly system which can be computer controlled to obtain style changing in a relatively short time automatically by a stored computer program. The system is also suitable for interfacing to future CAD/CAM systems. The system is modular, uses only the complexity needed, and is highly cost effective.

We claim:

1. A programmable assembly system for performing any of a variety of operations for different batch assemblies wherein at least some of the different batches have different end points, comprising:
   a relatively heavy machine base including one element shiftable in one direction in a horizontal plane, and including a table element supported by said one element and shiftable in another direction in a horizontal plane relative to said one element, said one and another directions being perpendicular to each other;
   a non-servo robot fixedly mounted on said table element for performing the batch assembly operations; and
   means for shifting said one element and said table element in the absence of operation of said robot to reposition said table element and accordingly reposition the end points of said robot in accordance with the product style of whatever batch operation is to be performed subsequent to the shifting.

2. A system according to claim 1 wherein:
   said machine base includes a third element supporting said one element and said table element, said third element being shiftable in a vertical direction perpendicular to said one and another directions.

* * * * *